J. H. Mallory,
R.R. Cattle Guard.
No. 112,473. Patented Mar. 7, 1871.
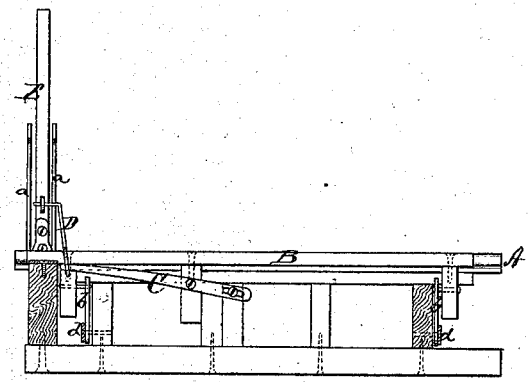
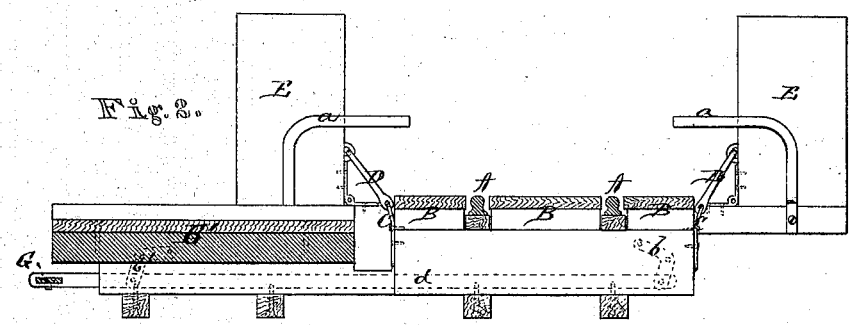
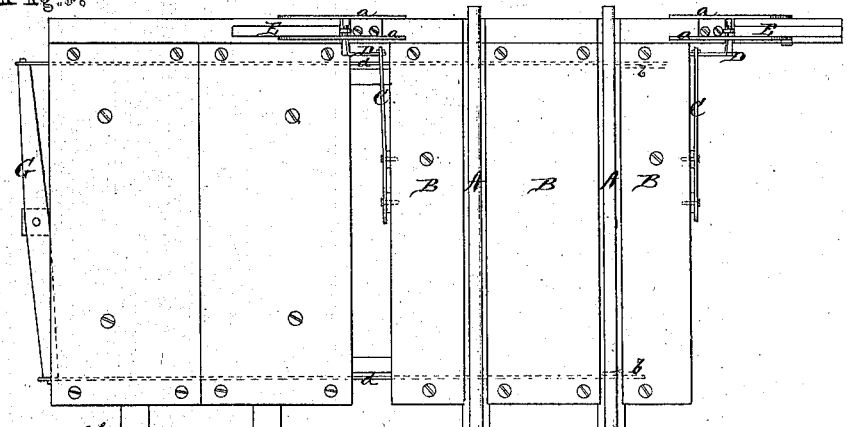

UNITED STATES PATENT OFFICE.

JAMES H. MALLORY, OF LA PORTE, INDIANA.

IMPROVEMENT IN RAILROAD CATTLE-GUARD GATES.

Specification forming part of Letters Patent No. 112,473, dated March 7, 1871.

*To all whom it may concern:*

Be it known that I, JAMES H. MALLORY, of La Porte, in the county of La Porte and State of Indiana, have invented a new and valuable Improvement in Railroad Cattle-Guard Gates; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my invention in transverse vertical section. Fig. 2 is a longitudinal vertical section, and Fig. 3 is a plan view of the same.

The nature of my invention consists in the construction and arrangement of a falling platform, to operate a gate or gates when an animal attempts to cross the guard, thus heading it off, and opening itself, ready for the train, when the animal leaves the platform.

In order to enable others skilled in the art to which my invention appertains to make and use the same, I will now proceed to describe its construction and operation, referring to the annexed drawings.

A A represent the rails of the track, between and on each side of which is arranged a platform, B, in such a manner that the train may pass over the same on the track without in any way interfering with the platform. On each side of this platform, to one of the timbers under it, which timbers form a part of it, is pivoted a lever, C, one end of which is slotted, as shown in Fig. 1, and attached by a screw or headed bolt to the end of one of the sleepers supporting the rails. The other end of this lever C is inserted in a hole in, or pivoted to, a bent arm, D, the other end of which works in an eye on the under side of the gate E.

The gates E E—one on each side of the track—are hinged at the outer lower corner, and when they fall down meet in the center of the track. They move each between separate guides *a a*, and when open are in the position shown in Fig. 2.

In suitable stationary timbers at each end of the platform B are pivoted elbow-levers *b b*, one end of each of said levers being pivoted to the end of the platform, while the other end is pivoted to a bar, *d*, which runs beyond the track on one side for a suitable distance. These bars *d d* are by other elbow-levers, *b′ b′*, connected with another weighted platform, B′, outside of the track, and the outer ends of the bars are connected by a horizontal walking-beam, G, pivoted as shown in Fig. 3. The elbow-levers at the two ends of the platforms are so arranged that the bars *d d* will always operate in opposite directions.

I am aware that railroad-gates have been made to open by the approaching train; but mine is always open, except when cattle or other animals attempt to cross the guard. The weighted platform B′, through the connecting bars and elbows, holds the track-platform B up, so that the gates will be raised up in the position shown in the drawings, and the way be always clear for trains to pass; but if any cattle or other animals should attempt to pass through they must step on the platform B, and their weight will at once overbalance the weight of the platform B′, so that, through the levers C and arms D, the gates will close and bar the way. The moment the animals step off the platform B the gates open again.

Having thus fully described my invention, what I claim as new, and desire to secure by Letters Patent, is—

1. The combination, with the rising and falling platform B, of the gates E E, hinged on each side of the track, and arranged to close by falling transversely across the said track, substantially as specified.

2. The combination, with the reciprocating platforms B B′, of the hinged gates E E and the guides *a a*, when constructed substantially as specified.

3. The combination of two platforms to operate a gate or gates, one closing the same when any additional weight comes thereon, and the other opening the same of its own weight when the additional weight from the former is removed, substantially as herein set forth.

In testimony that I claim the above I have hereunto subscribed my name in the presence of two witnesses.

JAMES H. MALLORY.

Witnesses:
 ELISHA L. BENNET,
 C. D. PURDY.